Mar. 27, 1923.

W. H. EXLEY ET AL.
ELECTRIC BATTERY OR ACCUMULATOR.
FILED JAN. 6, 1923.

1,449,746.

Inventors
William Herbert Exley,
George Harris Handasyde,
Toulmin & Toulmin,
Attorneys

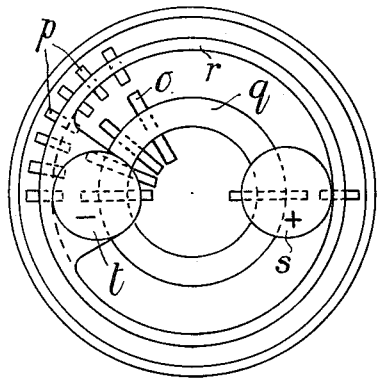
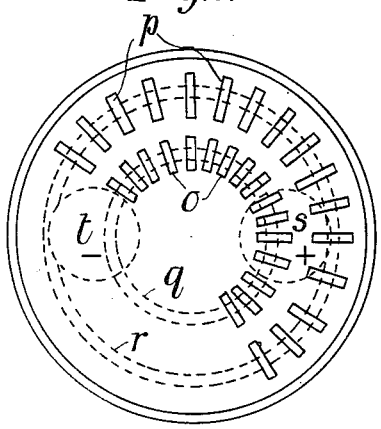
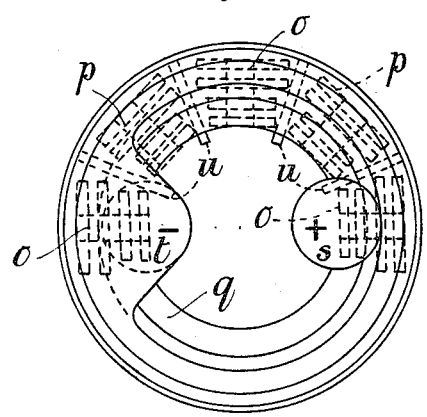

Patented Mar. 27, 1923.

1,449,746

UNITED STATES PATENT OFFICE.

WILLIAM HERBERT EXLEY, OF WOKING, AND GEORGE HARRIS HANDASYDE, OF WEST BYFLEET, ENGLAND, ASSIGNORS OF ONE-THIRD TO LEONARD CURTIS RAWLENCE, OF LONDON, ENGLAND.

ELECTRIC BATTERY OR ACCUMULATOR.

Application filed January 6, 1923. Serial No. 611,117.

*To all whom it may concern:*

Be it known that we, WILLIAM HERBERT EXLEY, of "The Rest," Maybury Hill, Woking, England, and GEORGE HARRIS HANDASYDE, of "The Vine," West Byfleet, Surrey, England, both subjects of the King of Great Britain and Ireland, have invented certain new and useful Improvements in or Relating to Electric Batteries or Accumulators.

This invention relates to electric secondary cells or accumulators.

An electric secondary cell or accumulator made in accordance with this invention is characterized by the features set forth in the following claims and is exemplified by the following description.

In carrying out our invention the positive grids are "burnt" or welded to a collector bar, and the distance between each adjacent grid is reduced to the minimum necessary to permit of sufficient electrolyte for the discharge of the active material. In addition the grids are secured rigidly together by inserting narrow strips of lead between adjacent grids of a thickness corresponding to the distance between the grids and any suitable width and length, such strips after being placed in position are "burnt" to the adjacent grids. As an alternative to the above the frames of the grids may be made with suitable projections to give the correct spacing when assembled, such projections being "burnt" together or to the frame of the adjacent grid, or the frames of the plates may be cast or otherwise made so that there is sufficient metal on them to fill in the spaces between the grid wherever any burning is required.

The negative plates are "burnt" up into electrodes in an exactly similar manner to that afore described for the positives, the result being that each electrode is in effect a mechanically strong laminated block, the dimensions of which depend upon the capacity of the cell and the way the sections are arranged in the cell containing boxes.

To illustrate the method of arranging the electrodes we will take the case of rectangular shaped cells, in which one form of arrangement consists in assembling the electrodes side by side, with the edges of the grids forming the positive electrode opposite, or approximately opposite the edges of the grids forming the negative electrode. A suitable separator is placed between each positive and negative electrode at right angles to the grids forming the electrodes.

The electrodes may be arranged so that their length corresponds either to the width of the cell containing box or to its length, in the former case increased capacity is obtained by increasing the number of electrodes per cell and in the latter case by increasing the length of the sections, that is to say increasing the number of plates comprising the section. In the latter case any convenient number of sections may make up a cell, as for example a convenient number would be two positive and three negative sections or vice versa arranged in such a way that the positive sections are flanked by the negative sections, or vice versa, the capacity of each of the outside sections being half that of the other sections so as to provide for an even discharge between the sections of opposite polarity. A greater or lesser number of sections may be used in the same cell box by decreasing or increasing the width of the plates forming the sections depending upon the type of work for which the cell is required.

It will be understood that the sections having the same polarity are suitably connected to a common terminal.

When desired the sections may be of the "protected" or "armoured" type for example the positive sections could be completely enclosed except at the top with thin wood veneer suitably treated for the purpose in the known manner, the result being that any dislodged pieces of material would be effectively prevented from causing short-circuits whilst within the armouring there would be a comparatively large body of free acid.

Other methods of armouring may be used, such as wrapping or packing the sections with glass wool, asbestos or the like materials suitable for the purpose, or by substituting for the wood veneer aforementioned, perforated hard rubber or celluloid, or hard rubber made porous by means of threads of porous material being embedded in it during the process of manufacture, Referring to the accompanying drawings:—

Fig. 8 is a plan view of a circular cell with the electrodes arranged concentrically;

Fig. 9 is a modification of Fig. 8;

Fig. 10 is a plan view of a circular cell with the electrodes arranged as approximate segments of a circle.

Referring to Figs. 1 to 7.

The positive plates $a$ and the negative plates $b$ are preferably cast or otherwise made with central lugs at the top, which latter project above the plates proper. The plates are then assembled in a suitable jig which spaces them the correct distance apart. The central lugs aforesaid are then welded or "burnt" in the known manner so that they form suitably shaped collector bars $c$ for the positive electrodes and $d$ for the negative electrodes. The bottoms of the plates are then welded or "burnt" together so that in effect there are metal strips $e$ on the positive electrodes and $f$ on the negative electrodes corresponding in width and length with the collector bars and approximately parallel to them. Where desired, the bottoms can be "burnt" across the whole width and length of the electrodes. The sides of the electrodes are also "burnt" together in a similar manner as shown at $g$ for the positive and $h$ for the negative electrodes, so as to produce in effect horizontal strips running across the electrodes, the number of such strips depending upon the height of the electrodes. Additional rigidity may be obtained by burning diagonally across the electrodes as shown dotted at $j$ Fig. 1.

To assemble any given size cell, the requisite number of positive electrodes are burnt to a common terminal bar $k$ and the negative electrodes to a common terminal bar $l$ after which the electrodes are assembled together, with porous or perforated separators $m$ in between the positive and negative electrodes.

The separators preferably extend to the bottom of the cell box so as to more effectively insulate the electrodes and where desired they can be so shaped as to entirely box in or armour the positive electrodes.

For cylindrical cells the electrodes may also be arranged either concentrically or as approximate segments of a circle.

Referring to Figs. 8, 9, 10, the positive electrodes $o$ and the negative electrodes $p$ are made by assembling a suitable number of positive and negative plates in a suitable jig, burning to their respective collector bars $q$ and $r$, terminals $s$ and $t$, also burning the frames together at the bottom, and the sides where necessary, in a similar manner as hereinbefore described.

Fig. 8 shews the example where the positive plates are half the number and twice the capacity of the negatives; and Fig. 9 shews the case where the number of plates in each electrode are equal in size and capacity. In Fig. 10, the electrodes are shaped to fit divisions of the cell which in plan are approximate sectors of a circle. Each electrode is in this case formed of four plates and is separated from its neighbours, which are of opposite polarity, by suitable separators $u$.

In the cases of Figs. 8 and 9, the discharge takes place in a radial direction, and in the case of Fig. 10 in a circumferential direction.

Figure 1:
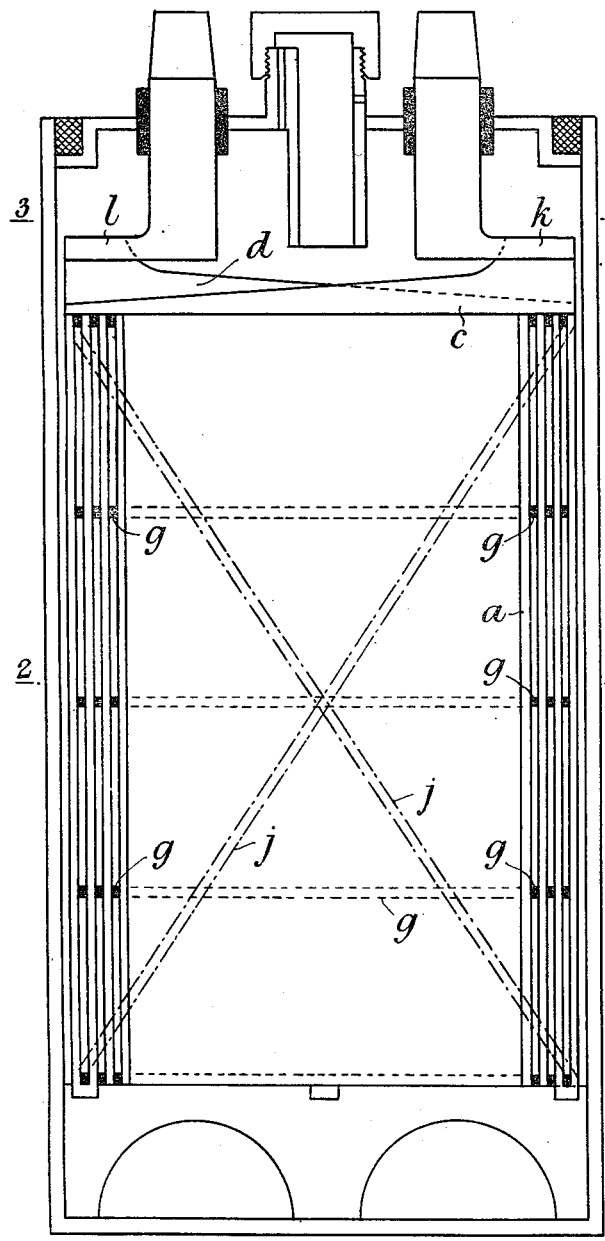
Fig. 1 is a sectional elevation of one form of secondary cell or accumulator made in accordance with this invention.
Figure 4:
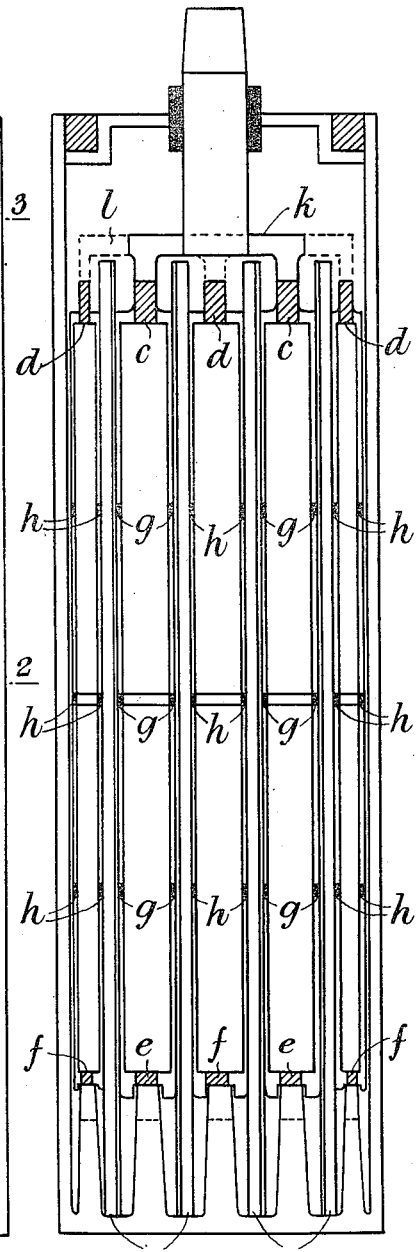
Fig. 4 is an end elevation at right angles to that shown in Fig. 1.
Figure 2:
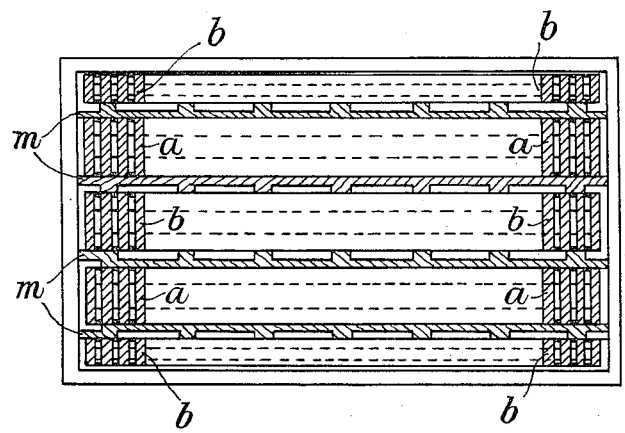
Fig. 2 is a section on line 2—2 of Fig. 1.
Figure 3:
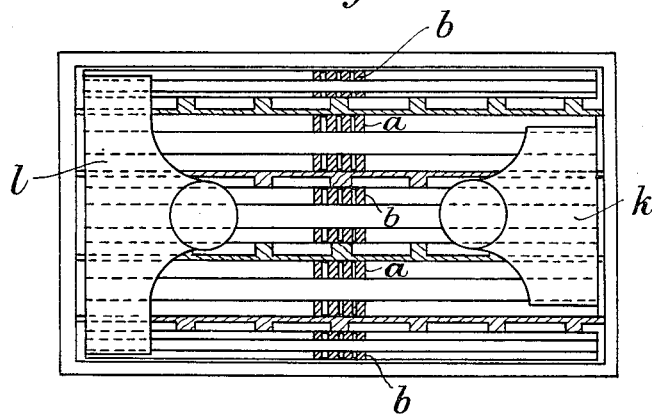
Fig. 3 is a section on line 3—3 of Fig. 1.
Figure 5:
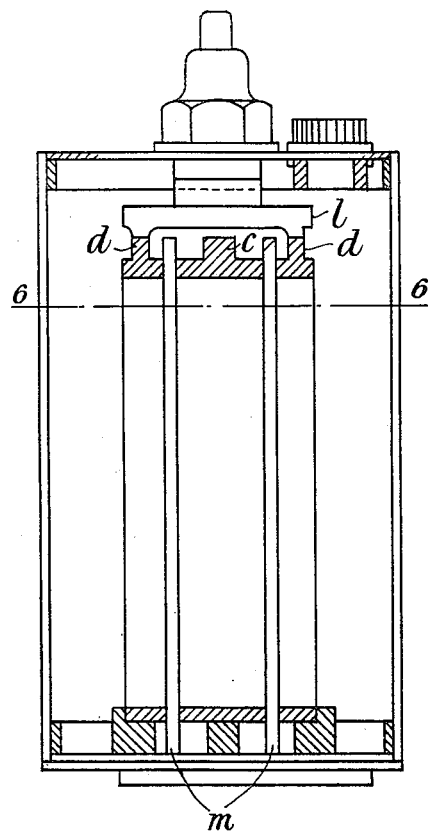
Fig. 5 is a sectional elevation of a circular cell.
Figure 7:
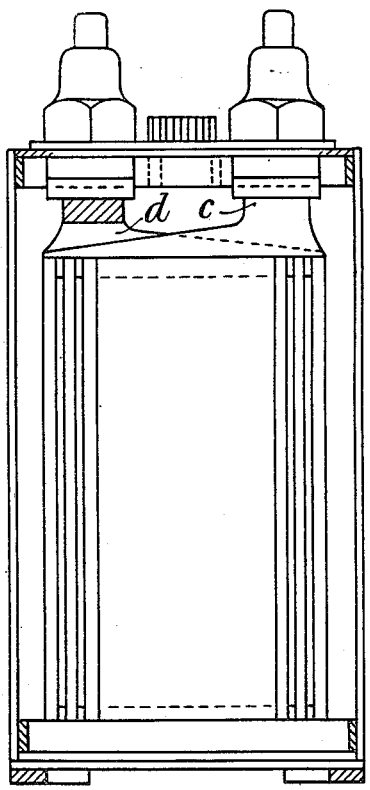
Fig. 7 is a sectional elevation of Fig. 5.
Figure 6:
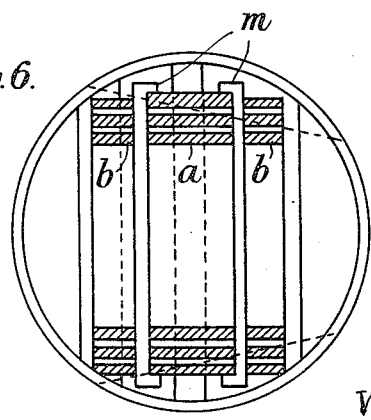
Fig. 6 is a section on line 6—6 of Fig. 5.

In the cylindrical cells higher voltages may be obtained by subdividing the electrodes and the cell box, the latter being subdivided across a diameter where a four volt cell is required and for higher voltages the cell subdivisions are radial in the arrangements shewn in Figs. 8, 9 and 10 and parallel to each other and at right angles to the electrode in the arrangement shewn in Figs. 5, 6 and 7.

What we claim and desire to secure by Letters Patent is:—

1. A plate for an electric accumulator of the pasted type comprising, a series of plane parallel perforated elements, said elements being spaced apart and positioned for edgewise electrolytic action with the plates of opposite polarity; the elements of each plate being integral with the corresponding strap connector, and also integral with each other at various points throughout the structure; said plate having integral diagonally reinforcing bars extending from the opposite corners thereof.

2. A plate for an electric accumulator of the pasted type comprising, a series of parallel perforated elements, said elements being spaced apart and positioned for edgewise electrolytic action with the plates of opposite polarity; the elements of each plate being integral with the corresponding strap connector, and also integral with each other at various points throughout the structure; said plate being also diagonally stabilized.

In testimony whereof, we affix our signatures.

WILLIAM HERBERT EXLEY.
GEORGE HARRIS HANDASYDE.